(12) United States Patent
Liang et al.

(10) Patent No.: US 8,929,021 B1
(45) Date of Patent: Jan. 6, 2015

(54) DISK DRIVE SERVO WRITING FROM SPIRAL TRACKS USING RADIAL DEPENDENT TIMING FEED-FORWARD COMPENSATION

(75) Inventors: Jiangang Liang, San Jose, CA (US); Wei Guo, Fremont, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 24 days.

(21) Appl. No.: 13/431,680

(22) Filed: Mar. 27, 2012

(51) Int. Cl.
*G11B 5/596* (2006.01)
*G11B 27/32* (2006.01)

(52) U.S. Cl.
CPC ..................................... *G11B 27/32* (2013.01)
USPC .............................. 360/77.04; 360/75; 360/55

(58) Field of Classification Search
CPC ............... G11B 5/596; G11B 5/59666; G11B 5/59627; G11B 5/59661; G11B 5/59688; G11B 5/59655
USPC .......... 360/77.01, 77.02, 77.03, 77.04, 77.05, 360/77.06, 77.07, 77.11, 75, 51, 55
See application file for complete search history.

(56) References Cited

U.S. PATENT DOCUMENTS

| | | | |
|---|---|---|---|
| 4,404,605 A | 9/1983 | Sakamoto | |
| 4,764,914 A | 8/1988 | Estes et al. | |
| 5,306,994 A | 4/1994 | Supino | |
| 5,416,759 A | 5/1995 | Chun | |
| 5,612,833 A | 3/1997 | Yarmchuk et al. | |
| 5,668,679 A | 9/1997 | Swearingen et al. | |
| 5,793,559 A | 8/1998 | Shepherd et al. | |
| 5,844,742 A | 12/1998 | Yarmchuk et al. | |
| 5,889,631 A | 3/1999 | Hobson | |
| 5,905,705 A | 5/1999 | Takeda et al. | |
| 5,907,447 A | 5/1999 | Yarmchuk et al. | |
| 5,930,068 A | 7/1999 | Gregg et al. | |
| 6,014,283 A | 1/2000 | Codilian et al. | |
| 6,052,076 A | 4/2000 | Patton, III et al. | |
| 6,052,250 A | 4/2000 | Golowka et al. | |
| 6,061,200 A | 5/2000 | Shepherd et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,101,065 A | 8/2000 | Alfred et al. | |
| 6,104,153 A | 8/2000 | Codilian et al. | |
| 6,118,739 A | 9/2000 | Kishinami et al. | |
| 6,122,133 A | 9/2000 | Nazarian et al. | |

(Continued)

OTHER PUBLICATIONS

Liang et. al., U.S. Appl. No. 14/149,565, filed Jan. 17, 2014, 28 pages.

(Continued)

*Primary Examiner* — Ali Neyzari

(57) ABSTRACT

A disk drive is disclosed comprising a head actuated over a disk comprising a plurality of spiral tracks, wherein each spiral track comprising a high frequency signal interrupted at a predetermined interval by a sync mark. An offset $r_0$ representing a difference between an axial rotation of the disk and an axial rotation of the spiral tracks is estimated. Radial dependent timing compensation values are generated in response to the estimated $r_0$. A phase error is generated in response to the sync marks in the spiral track crossings. A control signal is generated in response to the phase error and the radial dependent timing compensation values, and a frequency of an oscillator is adjusted in response to the control signal.

14 Claims, 10 Drawing Sheets

(56) References Cited

U.S. PATENT DOCUMENTS

| | | |
|---|---|---|
| 6,122,135 A | 9/2000 | Stich |
| 6,128,153 A | 10/2000 | Hasegawa et al. |
| 6,141,175 A | 10/2000 | Nazarian et al. |
| 6,160,368 A | 12/2000 | Plutowski |
| 6,181,502 B1 | 1/2001 | Hussein et al. |
| 6,181,652 B1 | 1/2001 | Katou et al. |
| 6,195,222 B1 | 2/2001 | Heminger et al. |
| 6,198,584 B1 | 3/2001 | Codilian et al. |
| 6,198,590 B1 | 3/2001 | Codilian et al. |
| 6,204,988 B1 | 3/2001 | Codilian et al. |
| 6,243,223 B1 | 6/2001 | Elliott et al. |
| 6,281,652 B1 | 8/2001 | Ryan et al. |
| 6,285,521 B1 | 9/2001 | Hussein |
| 6,292,320 B1 | 9/2001 | Mason et al. |
| 6,310,742 B1 | 10/2001 | Nazarian et al. |
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,370,094 B1 | 4/2002 | Kishinami et al. |
| 6,392,834 B1 | 5/2002 | Ellis |
| 6,421,198 B1 | 7/2002 | Lamberts et al. |
| 6,442,112 B1 | 8/2002 | Tateishi |
| 6,462,896 B1 | 10/2002 | Codilian et al. |
| 6,476,995 B1 | 11/2002 | Liu et al. |
| 6,476,996 B1 | 11/2002 | Ryan |
| 6,484,577 B1 | 11/2002 | Bennett |
| 6,493,169 B1 | 12/2002 | Ferris et al. |
| 6,496,322 B1 | 12/2002 | Hasegawa et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,510,112 B1 | 1/2003 | Sakamoto et al. |
| 6,522,493 B1 | 2/2003 | Dobbek et al. |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,563,663 B1 | 5/2003 | Bi et al. |
| 6,568,268 B1 | 5/2003 | Bennett |
| 6,574,062 B1 | 6/2003 | Bennett et al. |
| 6,577,465 B1 | 6/2003 | Bennett et al. |
| 6,606,214 B1 | 8/2003 | Liu et al. |
| 6,608,731 B2 | 8/2003 | Szita |
| 6,611,397 B1 | 8/2003 | Nguyen |
| 6,614,615 B1 | 9/2003 | Ju et al. |
| 6,614,618 B1 | 9/2003 | Sheh et al. |
| 6,624,963 B2 | 9/2003 | Szita |
| 6,636,377 B1 | 10/2003 | Yu et al. |
| 6,654,198 B2 | 11/2003 | Liu et al. |
| 6,657,810 B1 | 12/2003 | Kupferman |
| 6,667,840 B1 | 12/2003 | Cheong et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,040 B2 | 5/2004 | Galloway et al. |
| 6,735,041 B1 | 5/2004 | Codilian et al. |
| 6,738,220 B1 | 5/2004 | Codilian |
| 6,747,837 B1 | 6/2004 | Bennett |
| 6,751,042 B2 | 6/2004 | Bi et al. |
| 6,760,186 B1 | 7/2004 | Codilian et al. |
| 6,775,091 B1 | 8/2004 | Sutardja |
| 6,785,084 B2 | 8/2004 | Szita |
| 6,788,483 B1 | 9/2004 | Ferris et al. |
| 6,791,785 B1 | 9/2004 | Messenger et al. |
| 6,795,268 B1 | 9/2004 | Ryan |
| 6,798,606 B2 | 9/2004 | Tang et al. |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,862,155 B2 | 3/2005 | Yang et al. |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,922,304 B2 | 7/2005 | Nakagawa |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,320 B1 | 10/2005 | Pollock et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,965,491 B1 | 11/2005 | Perlmutter et al. |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,478 B2 | 12/2005 | Fukushima et al. |
| 6,975,480 B1 | 12/2005 | Codilian et al. |
| 6,977,789 B1 | 12/2005 | Cloke |
| 6,977,792 B1 | 12/2005 | Melrose et al. |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,266 B1 | 2/2006 | Schmidt |
| 6,999,267 B1 | 2/2006 | Melkote et al. |
| 7,002,767 B2 | 2/2006 | Annampedu et al. |
| 7,006,320 B1 | 2/2006 | Bennett et al. |
| 7,012,778 B2 | 3/2006 | Shigematsu |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,255 B2 | 4/2006 | Schmidt |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,096 B1 | 5/2006 | Sun et al. |
| 7,054,098 B1 | 5/2006 | Yu et al. |
| 7,057,836 B1 | 6/2006 | Kupferman |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 * | 6/2006 | Cloke et al. .................. 360/75 |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |

(56) References Cited

U.S. PATENT DOCUMENTS

| | | | |
|---|---|---|---|
| 7,106,542 | B1 | 9/2006 | Sun et al. |
| 7,106,547 | B1 | 9/2006 | Hargarten et al. |
| 7,110,208 | B1 | 9/2006 | Miyamura et al. |
| 7,110,209 | B2 | 9/2006 | Ehrlich et al. |
| 7,110,214 | B1 | 9/2006 | Tu et al. |
| 7,113,362 | B1 | 9/2006 | Lee et al. |
| 7,113,365 | B1 | 9/2006 | Ryan et al. |
| 7,116,505 | B1 | 10/2006 | Kupferman |
| 7,119,981 | B2 | 10/2006 | Hanson et al. |
| 7,123,433 | B1 | 10/2006 | Melrose et al. |
| 7,126,781 | B1 | 10/2006 | Bennett |
| 7,158,329 | B1 | 1/2007 | Ryan |
| 7,167,336 | B1 | 1/2007 | Ehrlich et al. |
| 7,180,703 | B1 | 2/2007 | Subrahmanyam et al. |
| 7,184,230 | B1 | 2/2007 | Chue et al. |
| 7,196,864 | B1 | 3/2007 | Yi et al. |
| 7,199,966 | B1 | 4/2007 | Tu et al. |
| 7,203,021 | B1 | 4/2007 | Ryan et al. |
| 7,209,321 | B1 | 4/2007 | Bennett |
| 7,212,364 | B1 | 5/2007 | Lee |
| 7,212,374 | B1 | 5/2007 | Wang et al. |
| 7,215,504 | B1 | 5/2007 | Bennett |
| 7,224,546 | B1 | 5/2007 | Orakcilar et al. |
| 7,230,786 | B1 | 6/2007 | Ray et al. |
| 7,248,426 | B1 | 7/2007 | Weerasooriya et al. |
| 7,251,098 | B1 | 7/2007 | Wang et al. |
| 7,253,582 | B1 | 8/2007 | Ding et al. |
| 7,253,989 | B1 | 8/2007 | Lau et al. |
| 7,257,062 | B2 | 8/2007 | Li et al. |
| 7,265,933 | B1 | 9/2007 | Phan et al. |
| 7,271,977 | B1 | 9/2007 | Melrose et al. |
| 7,286,317 | B1 | 10/2007 | Li et al. |
| 7,289,288 | B1 | 10/2007 | Tu |
| 7,298,574 | B1 | 11/2007 | Melkote et al. |
| 7,301,717 | B1 | 11/2007 | Lee et al. |
| 7,304,819 | B1 | 12/2007 | Melkote et al. |
| 7,315,431 | B1 | 1/2008 | Perlmutter et al. |
| 7,317,669 | B2 | 1/2008 | Lee |
| 7,330,019 | B1 | 2/2008 | Bennett |
| 7,330,322 | B2 | 2/2008 | Hanson et al. |
| 7,330,327 | B1 | 2/2008 | Chue et al. |
| 7,333,280 | B1 | 2/2008 | Lifchits et al. |
| 7,333,287 | B2 | 2/2008 | Hara |
| 7,333,288 | B2 | 2/2008 | Kim et al. |
| 7,333,290 | B1 | 2/2008 | Kupferman |
| 7,339,761 | B1 | 3/2008 | Tu et al. |
| 7,365,932 | B1 | 4/2008 | Bennett |
| 7,388,728 | B1 | 6/2008 | Chen et al. |
| 7,391,583 | B1 | 6/2008 | Sheh et al. |
| 7,391,584 | B1 | 6/2008 | Sheh et al. |
| 7,408,735 | B1 | 8/2008 | Coric |
| 7,433,143 | B1 | 10/2008 | Ying et al. |
| 7,436,742 | B2 | 10/2008 | Yanagawa |
| 7,440,210 | B1 | 10/2008 | Lee |
| 7,440,225 | B1 | 10/2008 | Chen et al. |
| 7,450,334 | B1 | 11/2008 | Wang et al. |
| 7,450,336 | B1 | 11/2008 | Wang et al. |
| 7,453,661 | B1 | 11/2008 | Jang et al. |
| 7,457,071 | B1 | 11/2008 | Sheh |
| 7,457,075 | B2 | 11/2008 | Liu et al. |
| 7,460,328 | B2 | 12/2008 | Chase et al. |
| 7,460,330 | B2 | 12/2008 | Takaishi |
| 7,466,509 | B1 | 12/2008 | Chen et al. |
| 7,468,855 | B1 | 12/2008 | Weerasooriya et al. |
| 7,474,491 | B2 | 1/2009 | Liikanen et al. |
| 7,477,471 | B1 | 1/2009 | Nemshick et al. |
| 7,477,473 | B2 | 1/2009 | Patapoutian et al. |
| 7,480,116 | B1 | 1/2009 | Bennett |
| 7,489,464 | B1 | 2/2009 | McNab et al. |
| 7,489,469 | B2 | 2/2009 | Sun et al. |
| 7,492,546 | B1 | 2/2009 | Miyamura |
| 7,495,857 | B1 | 2/2009 | Bennett |
| 7,499,236 | B1 | 3/2009 | Lee et al. |
| 7,502,192 | B1 | 3/2009 | Wang et al. |
| 7,502,195 | B1 | 3/2009 | Wu et al. |
| 7,502,197 | B1 | 3/2009 | Chue |
| 7,505,223 | B1 | 3/2009 | McCornack |
| 7,525,754 | B2 | 4/2009 | Melrose et al. |
| 7,542,225 | B1 | 6/2009 | Ding et al. |
| 7,548,392 | B1 | 6/2009 | Desai et al. |
| 7,551,387 | B2 | 6/2009 | Sun et al. |
| 7,551,390 | B1 | 6/2009 | Wang et al. |
| 7,558,016 | B1 | 7/2009 | Le et al. |
| 7,561,361 | B1 | 7/2009 | Rutherford |
| 7,573,670 | B1 | 8/2009 | Ryan et al. |
| 7,576,941 | B1 | 8/2009 | Chen et al. |
| 7,580,212 | B1 | 8/2009 | Li et al. |
| 7,583,470 | B1 | 9/2009 | Chen et al. |
| 7,595,954 | B1 | 9/2009 | Chen et al. |
| 7,602,575 | B1 | 10/2009 | Lifchits et al. |
| 7,616,399 | B1 | 11/2009 | Chen et al. |
| 7,619,844 | B1 | 11/2009 | Bennett |
| 7,626,782 | B1 | 12/2009 | Yu et al. |
| 7,630,162 | B2 | 12/2009 | Zhao et al. |
| 7,639,447 | B1 | 12/2009 | Yu et al. |
| 7,646,559 | B1 | 1/2010 | Cheung et al. |
| 7,656,604 | B1 | 2/2010 | Liang et al. |
| 7,656,607 | B1 | 2/2010 | Bennett |
| 7,660,067 | B1 | 2/2010 | Ji et al. |
| 7,663,835 | B1 | 2/2010 | Yu et al. |
| 7,675,707 | B1 | 3/2010 | Liu et al. |
| 7,679,854 | B1 | 3/2010 | Narayana et al. |
| 7,688,534 | B1 | 3/2010 | McCornack |
| 7,688,538 | B1 | 3/2010 | Chen et al. |
| 7,688,539 | B1 | 3/2010 | Bryant et al. |
| 7,697,233 | B1 | 4/2010 | Bennett et al. |
| 7,701,661 | B1 | 4/2010 | Bennett |
| 7,710,676 | B1 | 5/2010 | Chue |
| 7,715,138 | B1 * | 5/2010 | Kupferman ............ 360/51 |
| 7,729,079 | B1 | 6/2010 | Huber |
| 7,733,189 | B1 | 6/2010 | Bennett |
| 7,746,592 | B1 | 6/2010 | Liang et al. |
| 7,746,594 | B1 | 6/2010 | Guo et al. |
| 7,746,595 | B1 | 6/2010 | Guo et al. |
| 7,760,455 | B2 | 7/2010 | Kang et al. |
| 7,760,461 | B1 | 7/2010 | Bennett |
| 7,773,328 | B1 | 8/2010 | Katchmart et al. |
| 7,791,832 | B1 | 9/2010 | Cheung et al. |
| 7,796,479 | B2 | 9/2010 | Kim et al. |
| 7,800,853 | B1 | 9/2010 | Guo et al. |
| 7,800,856 | B1 | 9/2010 | Bennett et al. |
| 7,800,857 | B1 | 9/2010 | Calaway et al. |
| 7,800,859 | B2 | 9/2010 | Moriya et al. |
| 7,839,591 | B1 * | 11/2010 | Weerasooriya et al. ........ 360/51 |
| 7,839,595 | B1 | 11/2010 | Chue et al. |
| 7,839,600 | B1 | 11/2010 | Babinski et al. |
| 7,843,662 | B1 | 11/2010 | Weerasooriya et al. |
| 7,852,588 | B1 | 12/2010 | Ferris et al. |
| 7,852,592 | B1 | 12/2010 | Liang et al. |
| 7,864,481 | B1 | 1/2011 | Kon et al. |
| 7,864,482 | B1 | 1/2011 | Babinski et al. |
| 7,869,155 | B1 | 1/2011 | Wong |
| 7,876,522 | B1 | 1/2011 | Calaway et al. |
| 7,876,523 | B1 * | 1/2011 | Panyavoravaj et al. .... 360/77.07 |
| 7,881,005 | B1 | 2/2011 | Cheung et al. |
| 7,898,762 | B1 * | 3/2011 | Guo et al. .................. 360/77.08 |
| 7,916,415 | B1 | 3/2011 | Chue |
| 7,916,416 | B1 | 3/2011 | Guo et al. |
| 7,916,420 | B1 | 3/2011 | McFadyen et al. |
| 7,916,422 | B1 | 3/2011 | Guo et al. |
| 7,924,519 | B2 | 4/2011 | Lambert |
| 7,929,238 | B1 | 4/2011 | Vasquez |
| 7,961,422 | B1 | 6/2011 | Chen et al. |
| 8,000,053 | B1 | 8/2011 | Anderson |
| 8,031,423 | B1 | 10/2011 | Tsai et al. |
| 8,054,022 | B1 | 11/2011 | Ryan et al. |
| 8,059,357 | B1 | 11/2011 | Knigge et al. |
| 8,059,360 | B1 * | 11/2011 | Melkote et al. ............ 360/77.04 |
| 8,072,703 | B1 | 12/2011 | Calaway et al. |
| 8,077,428 | B1 | 12/2011 | Chen et al. |
| 8,078,901 | B1 | 12/2011 | Meyer et al. |
| 8,081,395 | B1 | 12/2011 | Ferris |
| 8,085,020 | B1 | 12/2011 | Bennett |
| 8,116,023 | B1 | 2/2012 | Kupferman |

(56) References Cited

U.S. PATENT DOCUMENTS

| | | |
|---|---|---|
| 8,116,025 B1 * | 2/2012 | Chan et al. .................. 360/77.06 |
| 8,145,934 B1 | 3/2012 | Ferris et al. |
| 8,174,941 B2 | 5/2012 | Takazawa et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 * | 4/2013 | Rigney et al. .................... 360/27 |
| 8,451,697 B1 * | 5/2013 | Rigney et al. .............. 369/44.28 |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,379 B1 | 12/2013 | Sun |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,717,704 B1 | 5/2014 | Yu et al. |
| 8,724,253 B1 | 5/2014 | Liang et al. |
| 8,743,495 B1 | 6/2014 | Chen et al. |
| 8,749,904 B1 | 6/2014 | Liang et al. |
| 2001/0040755 A1 | 11/2001 | Szita |
| 2002/0067567 A1 | 6/2002 | Szita |
| 2003/0218814 A9 | 11/2003 | Min et al. |
| 2005/0152246 A1 | 7/2005 | Li et al. |
| 2005/0168863 A1 | 8/2005 | Sakai et al. |
| 2005/0185319 A1 | 8/2005 | Liu et al. |
| 2005/0275964 A1 | 12/2005 | Hara |
| 2007/0096678 A1 | 5/2007 | Melrose |
| 2007/0097806 A1 | 5/2007 | Beker et al. |
| 2007/0297088 A1 | 12/2007 | Sun et al. |
| 2008/0002280 A1 | 1/2008 | Asakura |
| 2008/0186617 A1 | 8/2008 | Hosono et al. |
| 2008/0239555 A1 | 10/2008 | Ehrlich et al. |
| 2008/0279059 A1 | 11/2008 | Zhou |
| 2009/0002874 A1 | 1/2009 | Melrose et al. |
| 2009/0052081 A1 | 2/2009 | Chase et al. |
| 2009/0086364 A1 | 4/2009 | Gerasimov |
| 2010/0020428 A1 | 1/2010 | Mochizuki et al. |
| 2010/0035085 A1 | 2/2010 | Jung et al. |
| 2010/0195235 A1 | 8/2010 | Vikramaditya et al. |
| 2010/0214686 A1 | 8/2010 | Higa et al. |
| 2012/0033317 A1 | 2/2012 | Szita |
| 2012/0275050 A1 | 11/2012 | Wilson et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |

OTHER PUBLICATIONS

Liang et. al., Office Action dated Apr. 11, 2014 U.S. Appl. No. 14/149,565, 21 pages.

Liang et al., Notice of Allowance dated Aug. 4, 2014 U.S. Appl. No. 14/149,565, 41 pages.

Yuanyuan Zhao, et. al., U.S. Appl. No. 14/137,230, filed Dec. 20, 2013, 31 pages.

Yuanyuan Zhao, et. al., Notice of Allowance dated May 5, 2014 U.S. Appl. No. 14/137,230, filed Dec. 20, 2013, 25 pages.

* cited by examiner

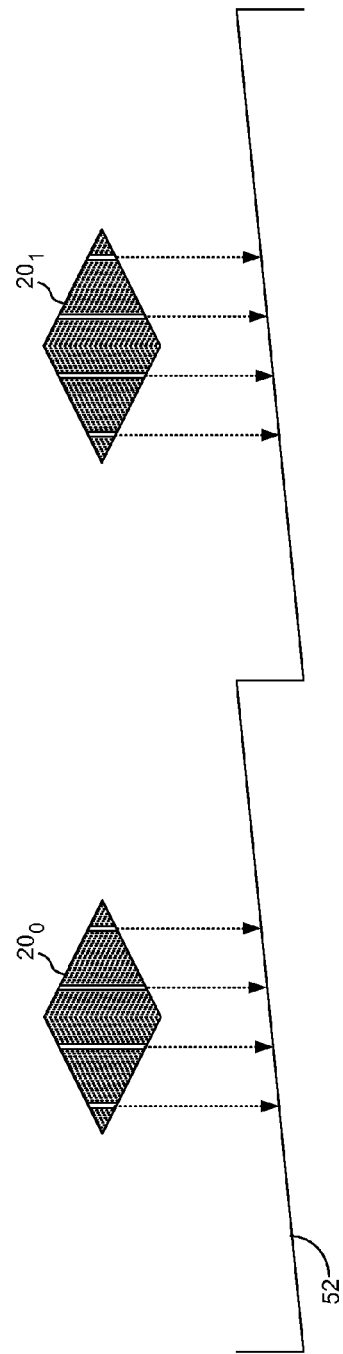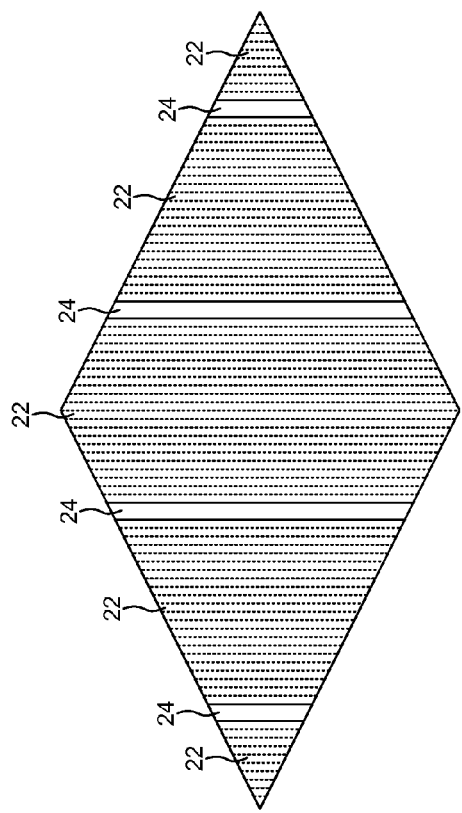

$$r_0 = \frac{(R_2 - R_1)}{(1/\tan\psi_2 - 1/\tan\psi_1)}$$
FIG. 11
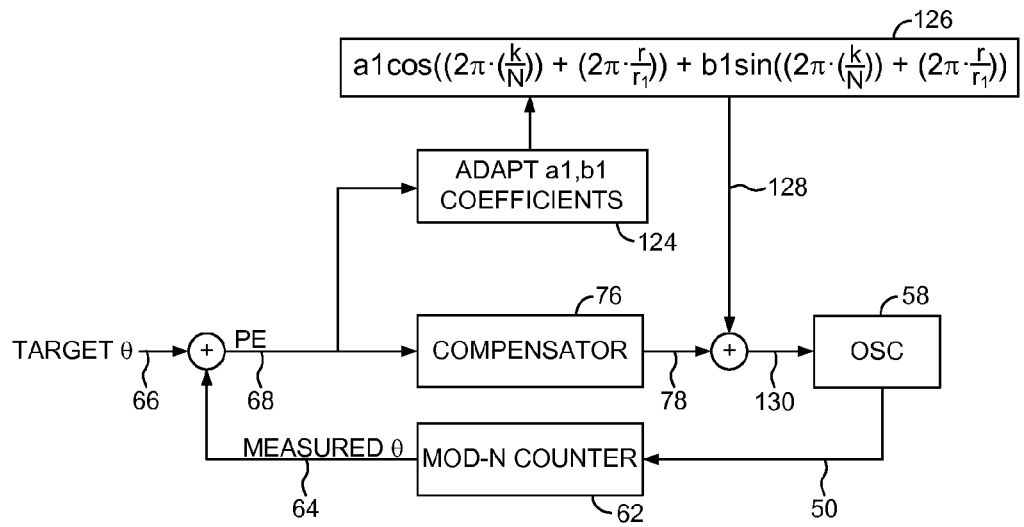
FIG. 12A
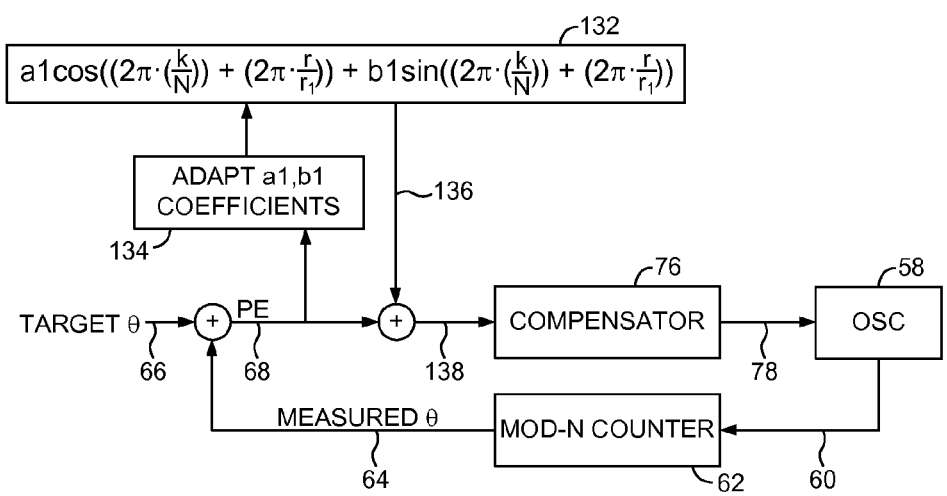
FIG. 12B

DISK DRIVE SERVO WRITING FROM SPIRAL TRACKS USING RADIAL DEPENDENT TIMING FEED-FORWARD COMPENSATION

BACKGROUND

When manufacturing a disk drive, concentric servo sectors $2_0$-$2_N$ are written to a disk 4 which define a plurality of radially-spaced, concentric data tracks 6 as shown in the prior art disk format of FIG. 1. Each data track 6 is partitioned into a plurality of data sectors wherein the concentric servo sectors $2_0$-$2_N$ are considered "embedded" in the data sectors. Each servo sector (e.g., servo sector $2_4$) comprises a preamble 8 for synchronizing gain control and timing recovery, a sync mark 10 for synchronizing to a data field 12 comprising coarse head positioning information such as a track number, and servo bursts 14 which provide fine head positioning information. The coarse head position information is processed to position a head over a target track during a seek operation, and the servo bursts 14 are processed to maintain the head over a centerline of the target track while writing or reading data during a tracking operation.

In the past, external servo writers have been used to write the concentric servo sectors $2_0$-$2_N$ to the disk surface during manufacturing. External servo writers employ extremely accurate head positioning mechanics, such as a laser interferometer, to ensure the concentric servo sectors $2_0$-$2_N$ are written at the proper radial location from the outer diameter of the disk to the inner diameter of the disk. However, external servo writers are expensive and require a clean room environment so that a head positioning pin can be inserted into the head disk assembly (HDA) without contaminating the disk. Thus, external servo writers have become an expensive bottleneck in the disk drive manufacturing process.

The prior art has suggested various "self-servo" writing methods wherein the internal electronics of the disk drive are used to write the concentric servo sectors independent of an external servo writer. For example, U.S. Pat. No. 5,668,679 teaches a disk drive which performs a self-servo writing operation by writing a plurality of spiral servo tracks to the disk which are then processed to write the concentric servo sectors along a circular path. Each spiral servo track is written to the disk as a high frequency signal (with missing bits), wherein the position error signal (PES) for tracking is generated relative to time shifts in the detected location of the spiral servo tracks. The read signal is rectified and low pass filtered to generate a triangular envelope signal representing a spiral servo track crossing, wherein the location of the spiral servo track is detected by detecting a peak in the triangular envelope signal relative to a clock synchronized to the rotation of the disk.

BRIEF DESCRIPTION OF THE DRAWINGS

FIG. 4A shows an embodiment of the present invention wherein a servo write clock is synchronized by clocking a modulo-N counter relative to when the sync marks in the spiral tracks are detected.

FIG. 4B shows an eye pattern generated by reading the spiral track, including the sync marks in the spiral track.

FIG. 11 shows an equation for computing the offset $r_0$.

FIGS. 12A and 12B show a timing control loop according to an embodiment of the present invention wherein coefficients of a sinusoid are adapted to learn the RRO of the phase error.

DETAILED DESCRIPTION

In an embodiment of the present invention, a disk drive comprises a head actuated over a disk comprising a plurality of spiral tracks, each spiral track comprising a high frequency signal interrupted at a predetermined interval by a sync mark. An offset $r_0$ representing a difference between an axial rotation of the disk and an axial rotation of the spiral tracks is estimated. Radial dependent timing compensation values are generated in response to the estimated $r_0$. A phase error is generated in response to the sync marks in the spiral track crossings. A control signal is generated in response to the phase error and the radial dependent timing compensation values, and a frequency of an oscillator is adjusted in response to the control signal.

The spiral tracks may comprise any suitable pattern and may be written to the disk using any suitable technique, such as using a media writer or an external writer for writing the spiral tracks to the disk, or stamping the spiral tracks on the disk using magnetic printing techniques. In another embodiment, the control circuitry internal to each production disk drive may be used to self-servo write the spiral tracks to the disk.

Figure 2A:
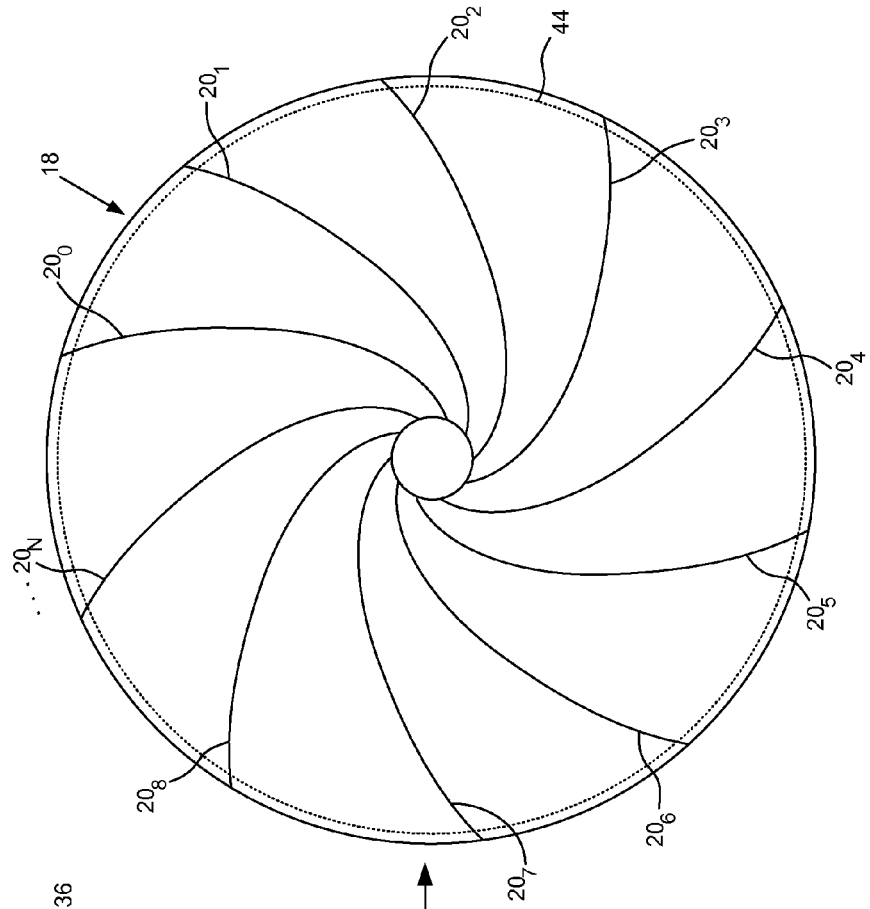
FIGS. 2A and 2B illustrate an embodiment of the present invention wherein an external spiral servo writer is used to write a plurality of spiral tracks to the disk for use in writing product servo sectors to the disk.
Figure 2B:
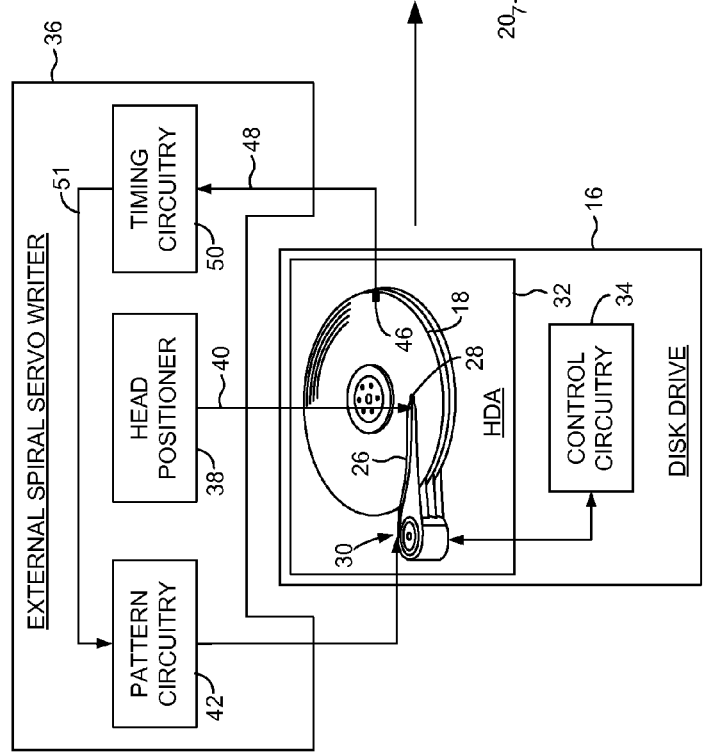

FIGS. 2A and 2B show an embodiment wherein a plurality of spiral tracks $20_0$-$20_N$ are written to a disk 18 of a disk drive 16 using an external spiral servo writer 36. The disk drive 16 comprises control circuitry 34 and a head disk assembly (HDA) 32 comprising the disk 18, an actuator arm 26, a head 28 coupled to a distal end of the actuator arm 26, and a voice coil motor 30 for rotating the actuator arm 26 about a pivot to position the head 28 radially over the disk 18. A write clock is synchronized to the rotation of the disk 18, and the plurality of spiral tracks $20_0$-$20_N$ are written on the disk 18 at a predetermined circular location determined from the write clock. Each spiral track $20_i$ comprises a high frequency signal 22 (FIG. 4B) interrupted at a predetermined interval by a sync mark 24.

The external spiral servo writer 36 comprises a head positioner 38 for actuating a head positioning pin 40 using sensitive positioning circuitry, such as a laser interferometer. Pattern circuitry 42 generates the data sequence written to the disk 18 for the spiral tracks $20_0$-$20_N$. The external spiral servo writer 36 inserts a clock head 46 into the HDA 32 for writing a clock track 44 (FIG. 2B) at an outer diameter of the disk 18. The clock head 46 then reads the clock track 44 to generate a clock signal 48 processed by timing recovery circuitry 50 to synchronize the write clock 51 for writing the spiral tracks $20_0$-$20_N$ to the disk 18. The timing recovery circuitry 50 enables the pattern circuitry 42 at the appropriate time relative to the write clock 51 so that the spiral tracks $20_0$-$20_N$ are written at the appropriate circular location. The timing recovery circuitry 50 also enables the pattern circuitry 42 relative to the write clock 51 to write the sync marks 24 (FIG. 4B) within the spiral tracks $20_0$-$20_N$ at the same circular location from the outer diameter to the inner diameter of the disk 18. As described below with reference to FIG. 5, the constant interval between sync marks 24 (independent of the radial location of the head 28) enables a servo write clock to maintain synchronization while writing the product servo sectors to the disk.

Figure 3:
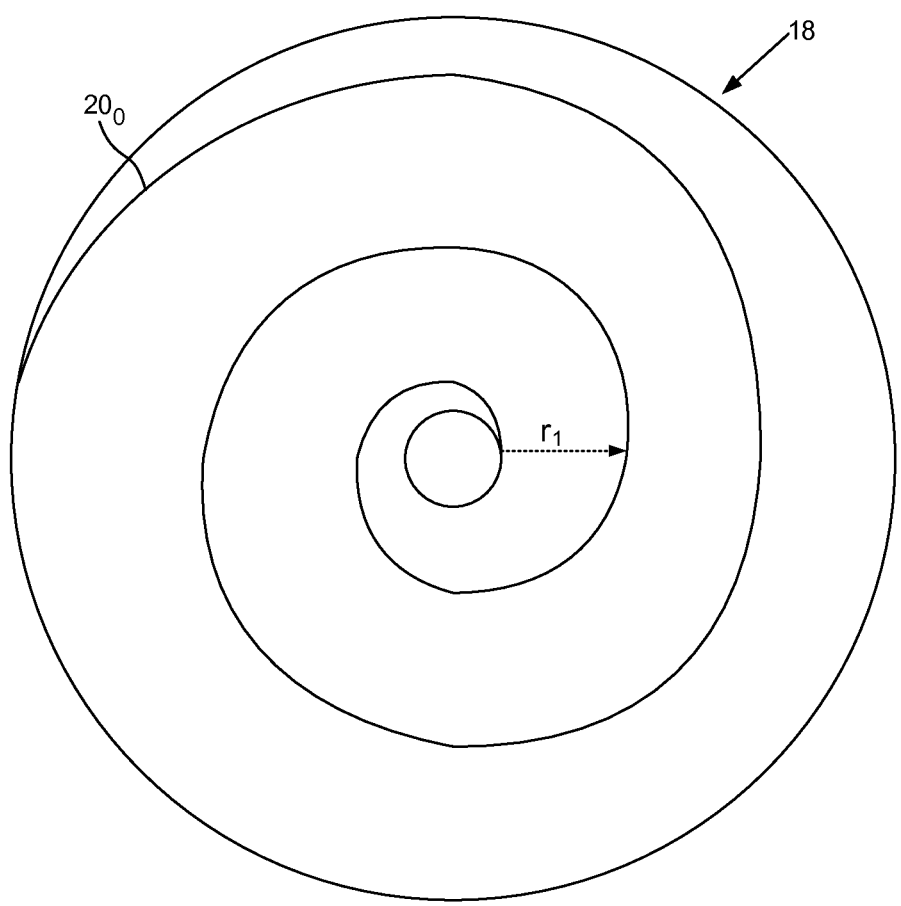
FIG. 3 illustrates an embodiment of the present invention wherein each spiral track is written over multiple revolutions of the disk.

In the embodiment of FIG. 2B, each spiral track $20_i$ is written over a partial revolution of the disk 18. In an alternative embodiment, each spiral track $20_i$ is written over one or more revolutions of the disk 18. FIG. 3 shows an embodiment wherein each spiral track $20_i$ is written over multiple revolutions of the disk 18. In the embodiment of FIG. 2A, the entire disk drive 16 is shown as being inserted into the external spiral servo writer 36. In an alternative embodiment, only the HDA 32 is inserted into the external spiral servo writer 36. In yet another embodiment, an external media writer is used to write the spiral tracks $20_0$-$20_N$ to a number of disks 18, and one or more of the disks 18 are then inserted into an HDA 32.

Referring again to the embodiment of FIG. 2A, after the external spiral servo writer 36 writes the spiral tracks $20_0$-$20_N$ to the disk 18, the head positioning pin 40 and clock head 46 are removed from the HDA 32 and the product servo sectors are written to the disk 18. In one embodiment, the control circuitry 34 within the disk drive 16 is used to process the spiral tracks $20_0$-$20_N$ in order to write the product servo sectors to the disk 18. In an alternative embodiment, an external product servo writer may be used to process the spiral tracks $20_0$-$20_N$ in order to write the product servo sectors to the disk 18 during a "fill operation".

FIG. 4B illustrates an "eye" pattern in the read signal that is generated when the head 28 crosses over a spiral track 20. The read signal representing the spiral track crossing comprises high frequency transitions 22 interrupted by sync marks 24 at a predetermined interval. When the head 28 moves in the radial direction, the eye pattern will shift (left or right) while the sync marks 24 remain fixed (ideally). The shift in the eye pattern (detected from the high frequency signal 22) relative to the sync marks 24 provides the off-track information (spiral position error signal (PES)) for servoing the head 28.

FIG. 4A shows an embodiment of the present invention wherein a saw-tooth waveform 52 is generated by clocking a modulo-N counter with the servo write clock, wherein the frequency of the servo write clock is adjusted until the sync marks 24 in the spiral tracks $20_0$-$20_N$ are detected at a target modulo-N count value. The servo write clock may be generated using any suitable circuitry, such as a phase locked loop (PLL). As each sync mark 24 in the spiral tracks $20_0$-$20_N$ is detected, the value of the modulo-N counter represents the phase error for adjusting the PLL.

Figure 1:
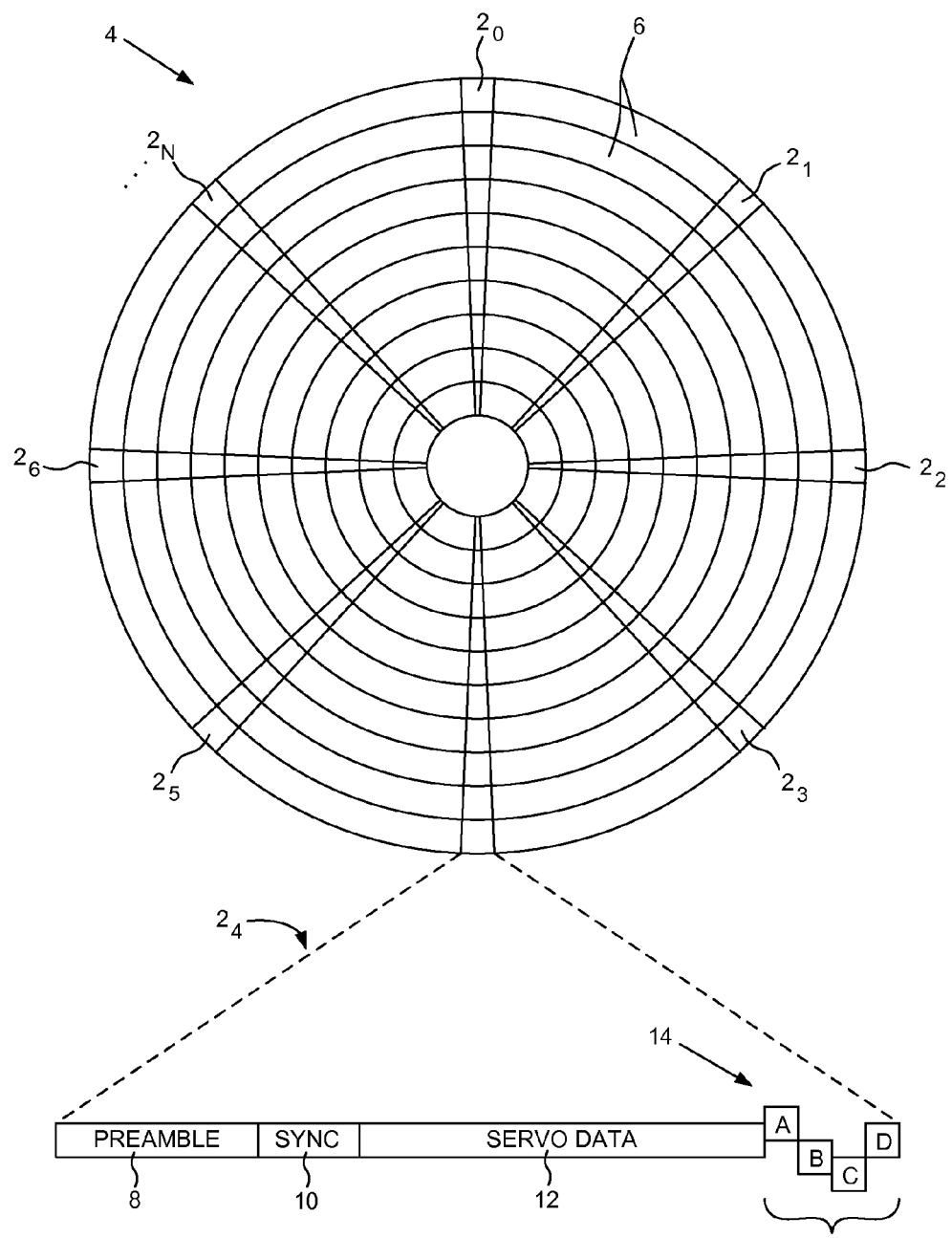
FIG. 1 shows a prior art disk format comprising a plurality of radially spaced, concentric tracks defined by a plurality of product servo sectors.

The sync marks 24 in the spiral tracks $20_0$-$20_N$ may comprise any suitable pattern, and in one embodiment, a pattern that is substantially shorter than the sync mark 10 in the conventional product servo sectors 2 of FIG. 1. A shorter sync mark 24 allows the spiral tracks $20_0$-$20_N$ to be written to the disk 18 using a steeper slope (by moving the head faster from the outer diameter to the inner diameter of the disk 18) which reduces the time required to write each spiral track $20_0$-$20_N$.

In one embodiment, the servo write clock is further synchronized by generating a timing recovery measurement from the high frequency signal 22 between the sync marks 24 in the spiral tracks $20_0$-$20_N$. Synchronizing the servo write clock to the high frequency signal 22 helps maintain proper radial alignment (phase coherency) of the Gray coded track addresses in the product servo sectors. The timing recovery measurement may be generated in any suitable manner. In one embodiment, the servo write clock is used to sample the high frequency signal 22 and the signal sample values are processed to generate the timing recovery measurement. The timing recovery measurement adjusts the phase of the servo write clock (PLL) so that the high frequency signal 22 is sampled synchronously. In this manner, the sync marks 24 provide a coarse timing recovery measurement and the high frequency signal 22 provides a fine timing recovery measurement for maintaining synchronization of the servo write clock.

Figure 5:
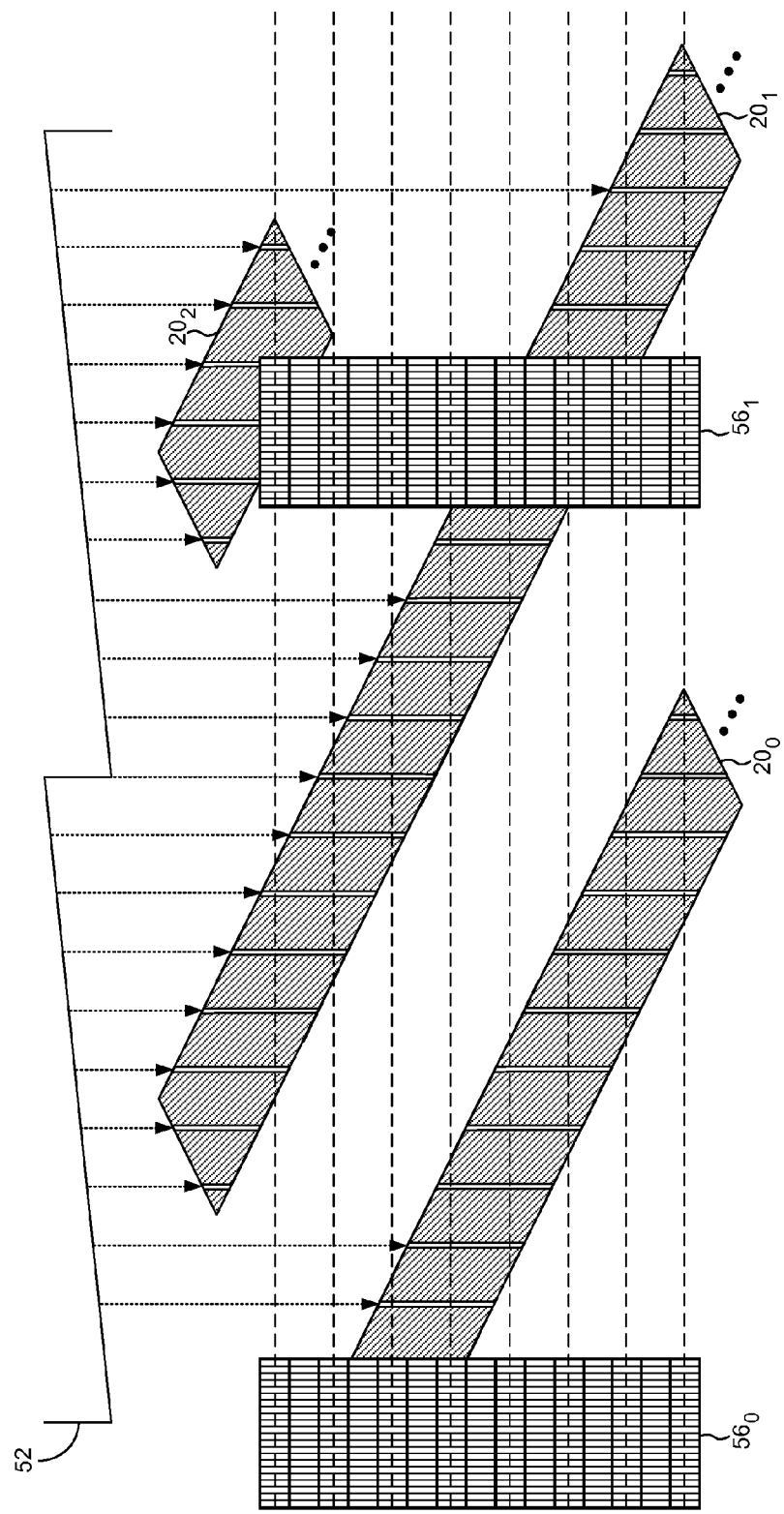
FIG. 5 illustrates writing of product servo sectors using a servo write clock generated from reading the spiral tracks.

FIG. 5 illustrates how the product servo sectors $56_0$-$56_N$ are written to the disk 18 after synchronizing the servo write clock in response to at least the sync marks 24 in the spiral tracks $20_0$-$20_N$. In the embodiment of FIG. 5, the dashed lines represent the centerlines of the data tracks. The sync marks in the spiral tracks $20_0$-$20_N$ are written so that there is a shift of two sync marks 24 in the eye pattern (FIG. 4B) between data tracks. In an alternative embodiment, the sync marks 24 in the spiral tracks $20_0$-$20_N$ are written so that there is a shift of N sync marks in the eye pattern between data tracks. In the embodiment of FIG. 5, each spiral track $20_0$-$20_N$ is wider than a data track, however, in an alternative embodiment the width of each spiral track $20_0$-$20_N$ is less than or proximate the width of a data track.

The spiral PES for maintaining the head 28 along a servo track (tracking) may be generated from the spiral tracks $20_0$-$20_N$ in any suitable manner. In one embodiment, the PES is generated by detecting the eye pattern in FIG. 4B using an envelope detector and detecting a shift in the envelope relative to the sync marks 24. In one embodiment, the envelope is detected by integrating the high frequency signal 22 and detecting a shift in the resulting ramp signal. In an alternative embodiment, the high frequency signal 22 between the sync marks 24 in the spiral tracks are demodulated as servo bursts and the PES generated by comparing the servo bursts in a similar manner as the servo bursts 14 in the product servo sectors (FIG. 1).

Once the head 28 is tracking on a servo track, the product servo sectors $56_0$-$56_N$ are written to the disk using the servo write clock. Write circuitry is enabled when the modulo-N counter reaches a predetermined value, wherein the servo write clock clocks the write circuitry to write the product servo sector 56 to the disk. The spiral tracks $20_0$-$20_N$ on the disk are processed in an interleaved manner to account for the product servo sectors $56_0$-$56_N$ overwriting a spiral track. For example, when writing the product servo sectors $56_1$ to the disk, spiral track $20_0$ is processed initially to generate the spiral PES tracking error and the servo write clock timing recovery measurement. When the product servo sectors $56_1$ begin to overwrite spiral track $20_1$, spiral track $20_0$ is processed to generate the spiral PES tracking error and the servo write clock timing recovery measurement.

In the embodiment of FIG. 2B, the spiral tracks $20_0$-$20_N$ are concentric with relative to a rotation axis of the disk, and therefore the spiral tracks define concentric servo tracks relative to the rotation axis of the disk. In reality the spiral tracks $20_0$-$20_N$ may be eccentric relative to the rotation axis of the disk due to a misalignment in clamping the disk to a spindle motor after writing the spiral tracks $20_0$-$20_N$ to the disk, or due to servo errors when self-writing the spiral tracks $20_0$-$20_N$ to the disk. The eccentricity of the spiral tracks $20_0$-$20_N$ results in an offset $r_0$ representing a difference between an axial rotation of the disk 18 and an axial rotation of the spiral tracks. This is illustrated in FIG. 6A which shows a center rotation of the disk (Cspin) relative to a center rotation of the spiral tracks (Cseed) and a corresponding offset $r_0$ between the two.

Figure 6A:
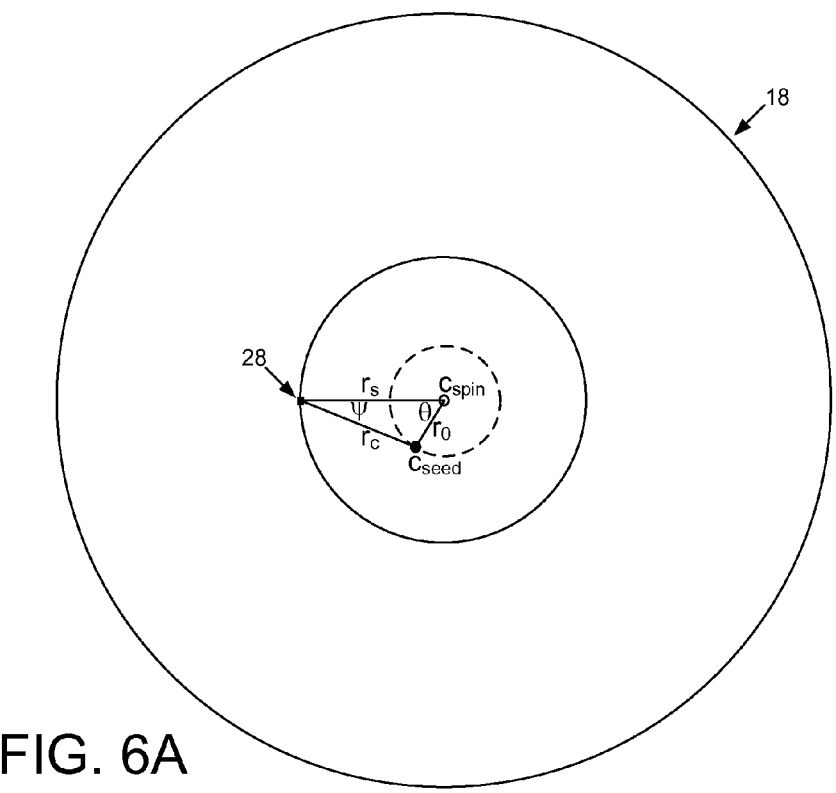
FIGS. 6A and 6B illustrate a radial dependent repeatable phase error relative to the spiral tracks due to an offset $r_0$ representing a difference between an axial rotation of the disk and an axial rotation of the spiral tracks.

As the disk 18 rotates about Cspin, Cseed will rotate about Cspin along the dashed circle shown in FIG. 6A. As a result, a circumferential phase offset is induced (relative to the head 28) between the circumferential phase of the disk 18 and the circumferential phase of the spiral tracks $20_0$-$20_N$. If the servo write clock is synchronized to the spiral tracks $20_0$-$20_N$, the resulting product servo sectors $56_0$-$56_N$ will be written to the disk 18 with a circumferential phase offset Ψ relative to the disk, thereby resulting in unevenly spaced produce servo sectors. In one embodiment, the circumferential phase offset is estimated and used to compensate timing control circuitry that generates the servo write clock so that the product servo sectors $56_0$-$56_N$ are written with substantially even spacing.

Figure 6B:
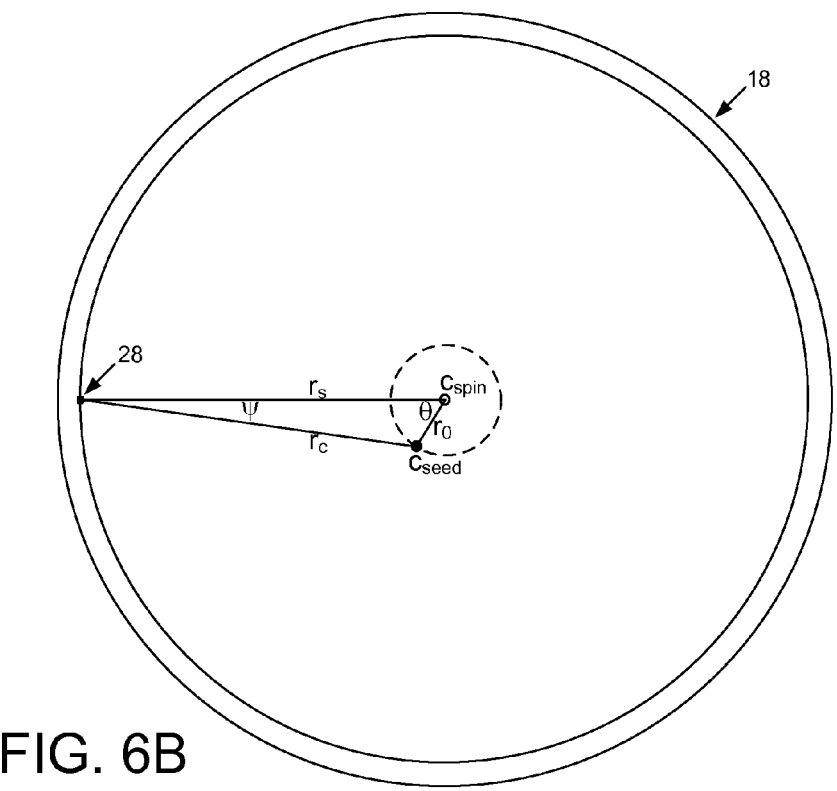

The magnitude of the circumferential phase offset P will vary based on the radial location of the head 28. This is illustrated in FIGS. 6A and 6B wherein the circumferential phase of the disk 18 is the same, but the magnitude of the circumferential phase offset Ψ decreases as the radial location increases toward the outer diameter of the disk 18. Since the circumferential phase offset Ψ varies in a sinusoid as the disk 18 rotates, the magnitude of the circumferential phase offset can be estimated in one embodiment according to:

$$\frac{r_0}{r_s}\sin\theta$$

where $r_s$ represents the radial location of the head 28, and θ represents the rotation angle of the disk 18. In the embodiment of FIG. 6A, θ represents the rotation angle of the disk 18 relative to Cseed and Cspin. That is, θ is zero when Cseed is aligned with the head 18 and with Cspin as illustrated in FIG. 6A.

Figure 7A:
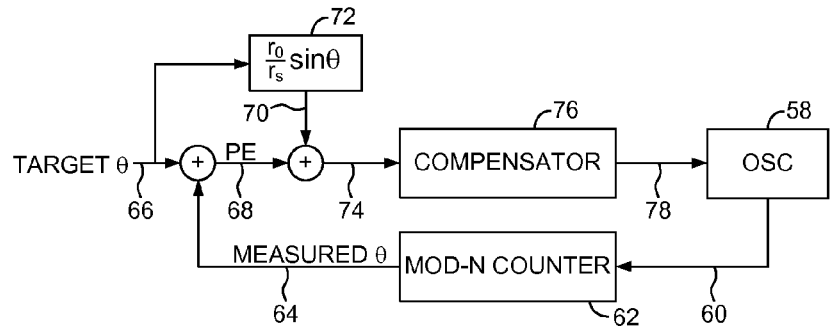
FIG. 7A shows timing control circuitry according to an embodiment of the present invention that cancels the repeatable phase error using radial dependent timing compensation values in order to generate a servo write clock substantially synchronized to the rotation of the disk.

FIG. 7A shows timing control circuitry according to an embodiment of the present invention wherein an oscillator 58 generates an output frequency 60 (the servo write clock) used to clock a modulo-N counter 62. The output 64 of the modulo-N counter represents a measured phase of the output frequency 60 which is subtracted from a target phase 66 to generate a phase error (PE) 68. The PE comprises a repeatable runout (RRO) corresponding to the circumferential phase offset Ψ described above. Accordingly, in the embodiment of FIG. 7A the PE 68 is adjusted by radial dependent timing compensation values 70 to generate an adjusted PE 74 having the RRO canceled from the PE 68, wherein the radial dependent timing compensation values 70 are generated according the equation in block 72 described above. The adjusted PE 74 is filtered using a suitable compensator 76 to generate a control signal 78 applied to the oscillator 58. Cancelling the RRO from the PE 68 causes the output frequency 60 of the oscillator 58 (the servo write clock) to synchronize to the rotation of the disk 18 rather than to the rotation of the spiral tracks $20_0$-$20_N$. Consequently, the product servo sectors $56_0$-$56_N$ are written on the disk 18 with a substantially even spacing.

Figure 7B:
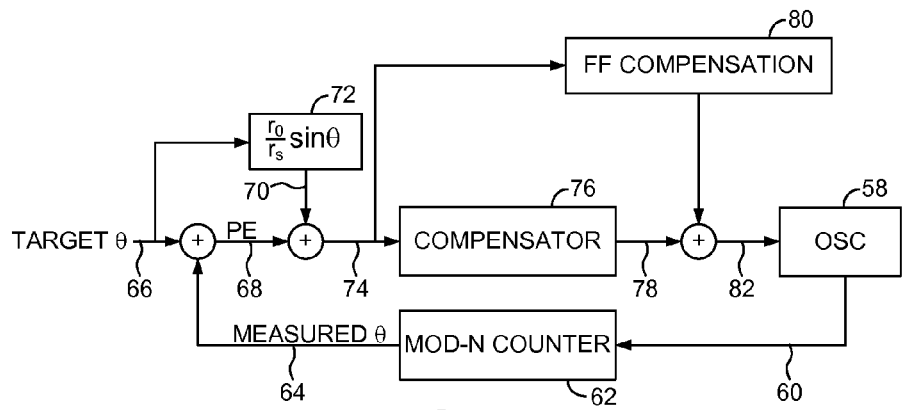
FIG. 7B shows timing control circuitry according to an embodiment of the present invention including feed-forward compensation values that compensate for a residual repeatable phase error.

FIG. 7B shows timing control circuitry according to another embodiment of the present invention including to generate feed-forward compensation values 80 in response to the adjusted PE 74, wherein the feed-forward compensation values 80 compensate for a residual RRO in the adjusted PE 74. The feed-forward compensation values 80 are used to adjust the control signal 78 to generate an adjusted control signal 82 applied to the oscillator 58 so as to force the output frequency 60 to follow the residual RRO while writing the product servo sectors $56_0$-$56_N$ to the disk, thereby improving the phase coherency of the product servo sectors $56_0$-$56_N$.

The offset $r_0$ between Cspin and Cseed shown in FIG. 6A may be estimated using any suitable technique, and in one embodiment, the offset $r_0$ is estimated in response to a position error signal (PES) used to servo the head over the disk in response to the spiral tracks. This embodiment is understood with reference to FIG. 8 which shows position control circuitry according to an embodiment of the present invention. An actuator 82 (e.g., a voice coil motor) actuates the head over the disk, and a position 86 of the head is measured 84 in response to the spiral track crossings. The measured position 86 of the head is subtracted from a target position 88 to generate the PES 90. The eccentricity of the spiral tracks will generate an RRO in the PES 90 corresponding to the offset $r_0$. The PES 90 is processed 92 to adapt coefficients (a1,b1) of a sinusoid 94, wherein the sinusoid 94 generates compensation values 96 that are subtracted from the PES 90 to generate an adjusted PES 98. The instantaneous phase of the sinusoid 94 is determined by the kth spiral track crossing out of N spiral track crossings, as well as the ratio of the radial location $r_s$ of the head to a partial radius of the disk $r_1$, where $r_1$ represents a part of the radius of the disk spanned by a complete revolution of the spiral tracks (as illustrated in FIG. 3).

The adjusted PES 98 is filtered using a suitable compensator 100 to generate a control signal 102 applied to the actuator 82. Eventually the coefficients (a1,b1) of the sinusoid 94 will adapt such that the RRO in the adjusted PES 98 is substantially canceled. Once the coefficients (a1,b1) have adapted, the amplitude of the resulting sinusoid 94 represents the amplitude of the offset $r_0$ in FIG. 6A. The phase of the sinusoid 94 may also be used to estimate the phase of the offset $r_0$ in FIG. 6A, thereby estimating when θ is zero in block 72 of FIG. 7A relative to the spiral track crossings.

Figure 8:
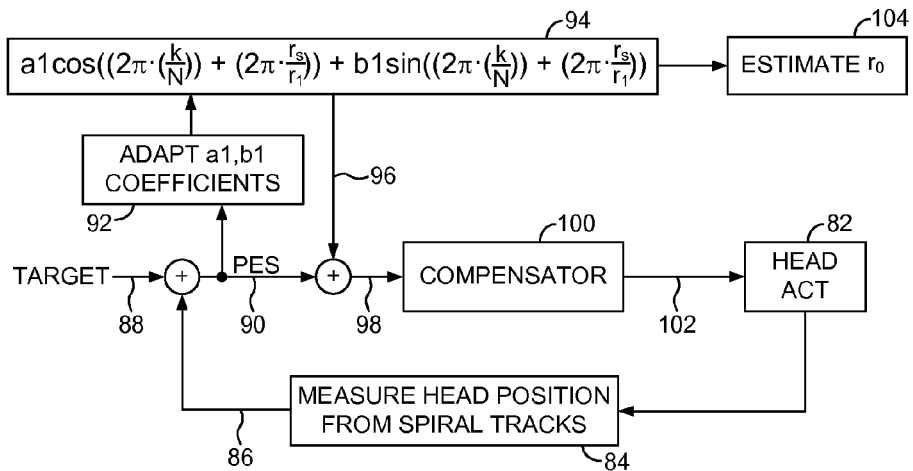
FIG. 8 shows position control circuitry according to an embodiment of the present invention that servos the head over the disk by generating a position error signal (PES), wherein the offset $r_0$ is estimated by estimating a repeatable runout in the PES.

In the embodiment of FIG. 8, the RRO is canceled from the PES 90 so that the product servo sectors $56_0$-$56_N$ written to the disk define substantially concentric servo tracks relative to Cspin. In an alternative embodiment, the RRO estimate in the PES 90 may be used to generate feed-forward compensation values which force the head to follow the RRO in the PES 90 while writing the product servo sectors $56_0$-$56_N$ to the disk so that the resulting servo tracks are concentric relative to Cseed, or a hybrid technique may be employed by adapting the coefficients of two sinusoids. In any event, the resulting sinusoid(s) that generates the position compensation values for the position control system may be used to estimate the magnitude and phase of the offset $r_0$ in FIG. 6A, which in turn is used in block 72 of FIG. 7A.

Figure 9:
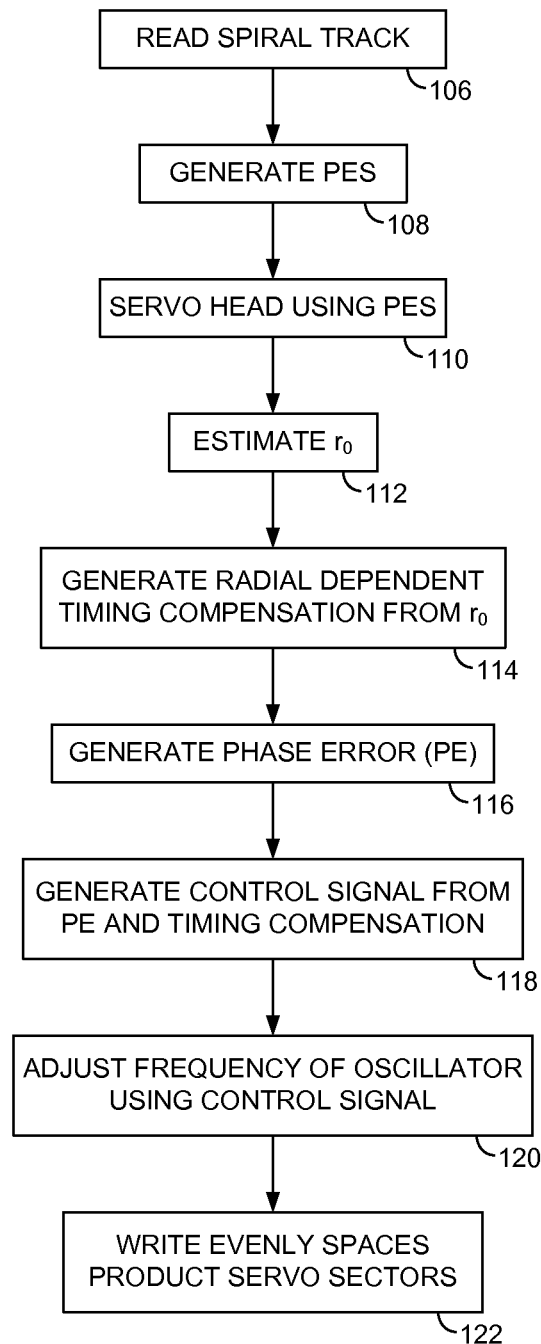
FIG. 9 is a flow diagram according to an embodiment of the present invention wherein a frequency of an oscillator is adjusted using the radial dependent timing compensation values in order to write evenly spaced product servo sectors.

FIG. 9 shows a flow diagram according to an embodiment of the present invention for writing substantially evenly spaced product servo sectors to the disk by employing radially dependent timing compensation values in the timing control loop that generates the servo write clock. The spiral tracks are read (block 106), a corresponding PES is generated (block 108), and the head servoed over the disk in response to the PES (block 110). The offset $r_0$ is estimated (block 112), such as by estimating the RRO in the PES of the position control loop as described above with reference to FIG. 8. Radial dependent timing compensation values are generated based on the offset $r_0$ (block 114) as described above. A phase error (PE) is generated (block 116), and a control signal is generated based on the phase error and the radial dependent timing compensation values (block 118), wherein an output frequency (servo write clock) of an oscillator is adjusted using the control signal (block 120). The servo write clock is then used to write substantially evenly spaced product servo sectors on the disk (block 122).

Figure 10A:
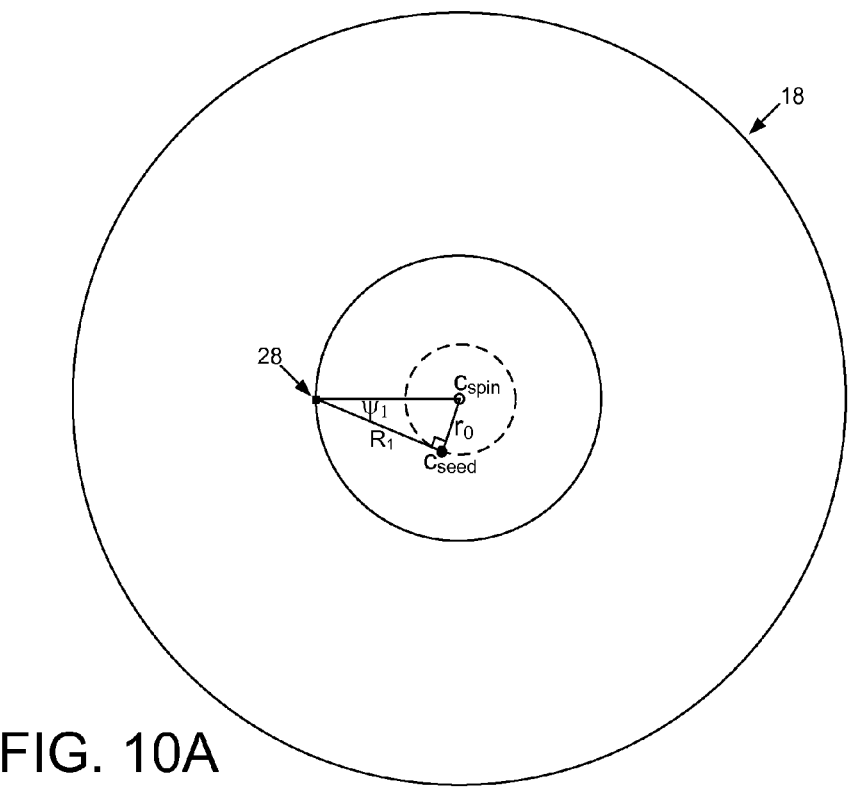
FIGS. 10A and 10B illustrate an embodiment of the present invention wherein repeatable runout (RRO) of a phase error at two radial locations is used to estimate the offset $r_0$.

The offset $r_0$ may be estimated in any suitable manner, and in one embodiment the offset $r_0$ is estimated in response to a repeatable runout (RRO) in the phase error of the PLL that generates the servo write clock. As the disk 18 rotates and Cseed rotates around Cspin as shown in FIG. 10A, a repeatable runout (RRO) is induced in the phase error of the PLL that generates the servo write clock. The instantaneous RRO in the phase error relative to the rotation angle of the disk is represented by the angle $\Psi_1$ in FIG. 10A. In addition, the angle $\Psi_1$ representing the RRO in the phase error will reach a peak when the distance R1 of the head 28 from Cseed forms a right angle with the offset $r_0$. Although the location of the head 28 can be determined relative to the spiral track $20_0$-$20_N$, the distance R1 of the head 28 from Cseed is unknown (because $r_0$ is unknown).

Figure 10B:
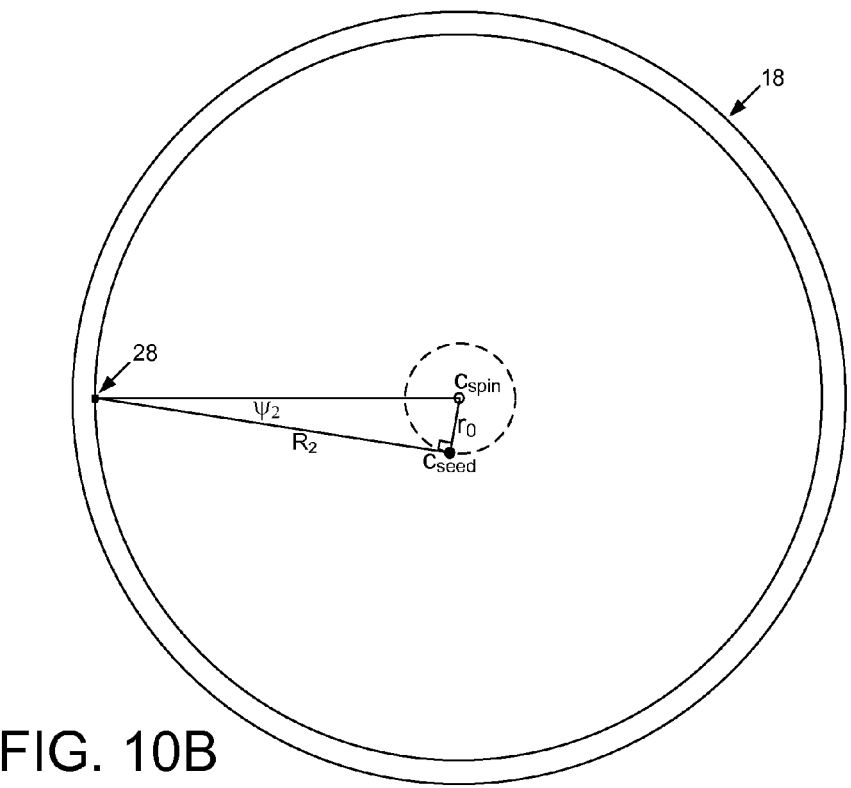

In one embodiment in order to estimate the offset $r_0$, the head 28 is positioned at a first radial location R1 as shown in FIG. 10A and a first peak $\Psi_1$ in a first RRO of the phase error is measured. The head 28 is then positioned at a second radial location R2 as shown in FIG. 10B and a second peak $\Psi_2$ in a second RRO of the phase error is measured. The offset $r_0$ may then be estimated in one embodiment as follows:

$$R2-R1 = r_0/\tan\psi_2 - r_0/\tan\psi_1$$

then $$r_0 = \frac{(R2-R1)}{(1/\tan\psi_2 - 1/\tan\psi_1)} \quad \text{(FIG. 11)}$$

The phase of the offset $r_0$ relative to the rotation angle of the disk 18 may be determined relative to the angle of the disk 18 when the RRO in the phase error reaches its peak. In the example shown in FIGS. 10A and 10B, the rotation angle of the disk 18 is slightly different between the first peak $\Psi_1$ and the second peak $\Psi_2$. In one embodiment, the phase of the offset $r_0$ may be computed as the average of the rotation phase of the disk measured at the first peak $\Psi_i$ and the second peak $\Psi_2$.

Estimating the offset $r_0$ using the above equation assumes the head 28 follows the RRO in the position error while servoing on the spiral tracks $20_0$-$20_N$ (e.g., using feed-forward compensation). In this manner, the distance between R1 and R2 can be measured based on the corresponding tracks defined by the spiral tracks $20_0$-$20_N$ when $\Psi_1$ and $\Psi_2$ reach their peak. In another embodiment, the RRO may be canceled from the position error while servoing on the spiral tracks $20_0$-$20_N$. In this embodiment, R1 and R2 may be measured along the axis aligned with Cspin based on the corresponding tracks defined by the spiral tracks $20_0$-$20_N$ when $\Psi_1$ and $\Psi_2$ reach their peak. Accordingly, the above equation in this embodiment is modified to derive the estimate for the offset $r_0$ based on the measured hypotenuse of the right triangles shown in FIGS. 10A and 10B.

FIG. 12A shows a timing control loop according to an embodiment of the present invention which is similar to the timing control loop described above with reference to FIG. 7A. The phase error 68 comprises a RRO due to the offset $r_0$ between Cspin and Cseed as described above. In this embodiment, the RRO in the phase error 68 may be learned by adapting coefficients a1,b1 (block 124) of a sinusoid 126 that generates feed-forward timing compensation values 128. The sinusoid is generated according to:

$$a1\cos\left(\left(2\pi\cdot\left(\frac{k}{N}\right)\right) + \left(2\pi\cdot\frac{r}{r_1}\right)\right) + b1\sin\left(\left(2\pi\cdot\left(\frac{k}{N}\right)\right) + \left(2\pi\cdot\frac{r}{r_1}\right)\right)$$

where a1 and b1 are the first coefficients, k is the kth spiral track out of N spiral tracks, r is the radial location of the head, and $r_1$ represents a part of the radius of the disk spanned by a complete revolution of the spiral tracks (as illustrated in FIG. 3).

The feed-forward timing compensation values 128 adjust the control signal 78 to generate an adjusted control signal 130 used to adjust the frequency of the oscillator 58. The coefficients a1,b1 are adapted 124 in order to drive the RRO in the phase error 68 toward zero. Once the coefficients a1,b1 have adapted, the resulting sinusoid 126 represents the RRO in the phase error 68, and the peak in the sinusoid 126 represents the peak in the RRO ($\Psi_1$ or $\Psi_2$ described above).

FIG. 12B shows an alternative embodiment of the present invention wherein coefficients a1,b1 of a sinusoid 132 may be adapted 134 in response to the phase error 68 to generate timing compensation values 136 that are subtracted from the phase error 68 in order to generate an adjusted phase error 138. The coefficients a1,b1 are adapted until the RRO is substantially canceled from the adjusted phase error 138, thereby generating a servo write clock 60 that is synchronized to the rotation of the disk 18 rather than to the rotation of the spiral tracks $20_0$-$20_N$ as in the embodiment of FIG. 12A. Similar to the embodiment of FIG. 12A, after the coefficients a1,b1 have adapted, the resulting sinusoid 132 represents the RRO in the phase error 68, and the peak in the sinusoid 132 represents the peak in the RRO ($\Psi_1$ or $\Psi_2$ described above).

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
a disk comprising a plurality of spiral tracks, wherein each spiral track comprising a high frequency signal interrupted at a predetermined interval by a sync mark;
a head actuated over the disk; and
control circuitry operable to:
estimate an offset $r_0$ representing a difference between an axial rotation of the disk and an axial rotation of the spiral tracks;
generate radial dependent timing compensation values in response to the estimated $r_0$;
generate a phase error in response to the sync marks in the spiral track crossings;
generate a control signal in response to the phase error and the radial dependent timing compensation values; and
adjust a frequency of an oscillator in response to the control signal.

2. The disk drive as recited in claim 1, wherein the control circuitry is operable to:
use the head to read the spiral tracks to generate a read signal representing spiral track crossings;
generate a position error signal (PES) in response to the spiral track crossings;
servo the head over the disk in response to the PES; and
estimate the offset $r_0$ in response to the PES.

3. The disk drive as recited in claim 2, wherein the control circuitry is further operable to:
estimate a sinusoidal disturbance in the PES; and
estimate the offset $r_0$ in response to the estimated sinusoidal disturbance.

4. The disk drive as recited in claim 1, wherein the control circuitry is operable to generate the radial dependent timing compensation values according to:

$$\frac{r_0}{r_s}\sin\theta$$

where:
$r_s$ represents the radial location of the head; and
$\theta$ represents the rotation angle of the disk.

5. The disk drive as recited in claim 1, wherein the control circuitry is further operable to adjust the phase error in response to the timing compensation values to generate an adjusted phase error.

6. The disk drive as recited in claim 5, wherein the control circuitry is further operable to:
generate feed-forward compensation values in response to the adjusted phase error, wherein the feed-forward compensation values compensate for a residual repeatable runout in the adjusted phase error; and
generate the control signal in response to the adjusted phase error, the radial dependent timing compensation values, and the feed-forward compensation values.

7. The disk drive as recited in claim 5, wherein the control circuitry is further operable to write substantially evenly spaced product servo sectors on the disk in response to the frequency of the oscillator.

8. A method of operating a disk drive, the disk drive comprising a head actuated over a disk comprising a plurality of spiral tracks, wherein each spiral track comprising a high frequency signal interrupted at a predetermined interval by a sync mark, the method comprising:
estimating an offset $r_0$ representing a difference between an axial rotation of the disk and an axial rotation of the spiral tracks;
generating radial dependent timing compensation values in response to the estimated $r_0$;
generating a phase error in response to the sync marks in the spiral track crossings;
generating a control signal in response to the phase error and the radial dependent timing compensation values; and
adjusting a frequency of an oscillator in response to the control signal.

9. The method as recited in claim 8, further comprising:
using the head to read the spiral tracks to generate a read signal representing spiral track crossings;
generating a position error signal (PES) in response to the spiral track crossings;
servoing the head over the disk in response to the PES; and
estimating the offset $r_0$ in response to the PES.

10. The method as recited in claim 9, further comprising:
estimating a sinusoidal disturbance in the PES; and
estimating the offset $r_0$ in response to the estimated sinusoidal disturbance.

11. The method as recited in claim 8, further comprising generating the radial dependent timing compensation values according to:

$$\frac{r_0}{r_s}\sin\theta$$

where:
$r_s$ represents the radial location of the head; and
$\theta$ represents the rotation angle of the disk.

12. The method as recited in claim 8, further comprising adjusting the phase error in response to the timing compensation values to generate an adjusted phase error.

13. The method as recited in claim 12, further comprising:
generating feed-forward compensation values in response to the adjusted phase error, wherein the feed-forward compensation values compensate for a residual repeatable runout in the adjusted phase error; and
generating the control signal in response to the adjusted phase error, the radial dependent timing compensation values, and the feed-forward compensation values.

14. The method as recited in claim 12, further comprising writing substantially evenly spaced product servo sectors on the disk in response to the frequency of the oscillator.

* * * * *